United States Patent
Cai et al.

(10) Patent No.: US 9,936,025 B2
(45) Date of Patent: Apr. 3, 2018

(54) APPLICATION FOR VEHICLE-TO-VEHICLE COMMUNICATION

(71) Applicant: SAP SE, Walldorf (DE)

(72) Inventors: Danqing Cai, Singapore (SG); Haiyun Lu, Singapore (SG); Kar Leong Tew, Singapore (SG)

(73) Assignee: SAP SE, Walldorf (DE)

( * ) Notice: Subject to any disclaimer, the term of this patent is extended or adjusted under 35 U.S.C. 154(b) by 264 days.

(21) Appl. No.: 14/316,775

(22) Filed: Jun. 26, 2014

(65) Prior Publication Data

US 2015/0381551 A1    Dec. 31, 2015

(51) Int. Cl.

| G06F 15/16 | (2006.01) |
|---|---|
| H04L 29/08 | (2006.01) |
| H04L 12/58 | (2006.01) |
| G06F 3/16 | (2006.01) |

(52) U.S. Cl.
CPC ............... *H04L 67/12* (2013.01); *G06F 3/16* (2013.01); *H04L 51/046* (2013.01); *H04L 51/10* (2013.01)

(58) Field of Classification Search
CPC ..... G06Q 10/107; H04L 12/585; H04L 12/58; H04L 12/581
USPC .......................................................... 709/206
See application file for complete search history.

(56) References Cited

U.S. PATENT DOCUMENTS

| 5,668,880 A | 9/1997 | Alajajian |
| 5,844,987 A | 12/1998 | Matthew et al. |
| 6,269,372 B1 | 7/2001 | Wertheim |
| 6,720,920 B2 | 4/2004 | Breed et al. |
| 6,940,423 B2 | 9/2005 | Takagi et al. |
| 7,502,827 B2 | 3/2009 | Arfaa |
| 8,307,037 B2 | 11/2012 | Bain et al. |
| 8,458,315 B2 | 6/2013 | Miche et al. |
| 8,570,166 B2 | 10/2013 | Ge et al. |
| 2006/0059229 A1* | 3/2006 | Bain .................... G01C 21/26 709/205 |
| 2007/0162550 A1* | 7/2007 | Rosenberg ............ H04L 51/04 709/206 |
| 2008/0276003 A1 | 11/2008 | Dudley et al. |
| 2011/0173279 A1 | 7/2011 | Janke |

(Continued)

OTHER PUBLICATIONS

Olivia Solon, Social network connects drivers, http://www.wired.co.uk/news/archive/2010-10/04/bump-social-network-for-cars, Bump.com, 2014, Condé Nast UK.

(Continued)

*Primary Examiner* — Alan S Chou
(74) *Attorney, Agent, or Firm* — Jones Day

(57) ABSTRACT

Described herein is a framework for vehicle-to-vehicle communication. In accordance with one aspect, a send message to a receiving driver of a receiving vehicle is generated from a sending end-user device in response to a user event from a sending driver. The send message may be generated to include an image of the receiving vehicle of the receiving driver, and a voice message created by the sending driver. The send message may be sent to a server using the sending end-user device. The send message may further be processed by the server, in which the processing may include identifying the receiving vehicle, searching to find information of a receiving end-user device, and sending the send message to the receiving end-user device if information of the receiving end-user device is found.

20 Claims, 7 Drawing Sheets

(56) References Cited

U.S. PATENT DOCUMENTS

| | | | |
|---|---|---|---|
| 2012/0116661 A1 | 5/2012 | Mizrachi | |
| 2012/0233264 A1* | 9/2012 | Krupman | H04L 51/28 709/206 |
| 2014/0074390 A1 | 3/2014 | Williams et al. | |
| 2014/0180764 A1 | 6/2014 | Lehmann | |
| 2015/0113012 A1* | 4/2015 | Silver | H04L 51/38 707/758 |
| 2015/0145695 A1* | 5/2015 | Hyde | G06Q 40/08 340/905 |

OTHER PUBLICATIONS

Wikipedia, Vehicular communication systems, http://en.wikipedia.org/wiki/Vehicular_communication_systems, Nov. 28, 2005.

\* cited by examiner

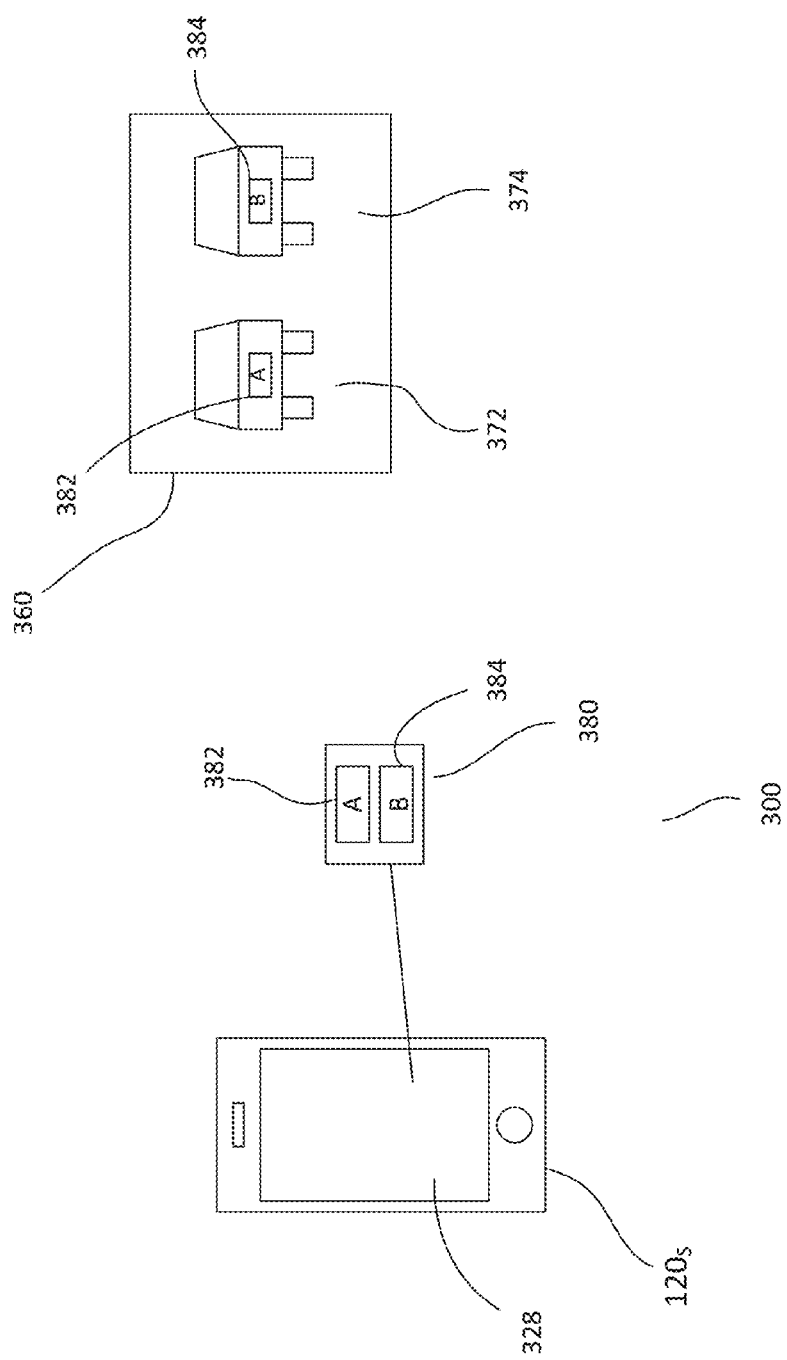

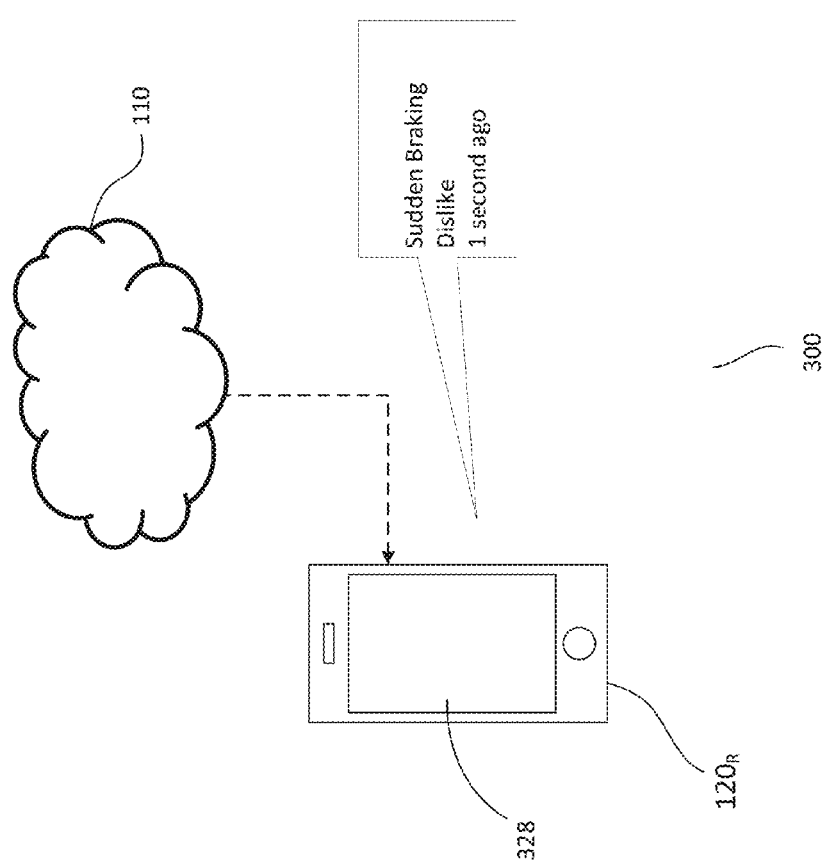

APPLICATION FOR VEHICLE-TO-VEHICLE COMMUNICATION

TECHNICAL FIELD

The present disclosure relates generally to a framework for vehicle-to-vehicle communication using a mobile application (App).

BACKGROUND

Vehicles are and will continue to be an essential component of our daily lives. Society relies on vehicles to provide transportation. As the roads are full of vehicles, driver actions, such as driver etiquette, may impact other drivers. The impact may be negative. For example, a driver may be driving inappropriately, such as speeding and weaving in and out of lanes, creating hazardous driving conditions. In other cases, the driver may forget to turn on the automotive lights of his or her vehicle at night. Such driver actions may negatively impact road safety. Providing feedback to drivers regarding their actions and impact in real time may improve road safety or safer driving conditions. For example, a driver may, after receiving feedback from another driver, correct the negative conditions. However, currently, inter-driver communication on the road is limited. For example, inter-driver communication currently may include flashing lights, gesticulations, as well as honking to get driver attention. Such limited techniques for inter-driver communications may not be adequate.

From the foregoing discussion, it is desirable to provide an App to facilitate vehicle-to-vehicle communication.

SUMMARY

A framework for vehicle-to-vehicle communication is described herein. In accordance with one aspect, a send message to a receiving driver of a receiving vehicle is generated from a sending end-user device in response to a user event from a sending driver. The send message may be generated to include an image of the receiving vehicle of the receiving driver, and a voice message created by the sending driver. The send message may be sent to a server using the sending end-user device. The send message may further be processed by the server, which includes identifying the receiving vehicle, searching to find information of a receiving end-user device, and sending the send message to the receiving end-user device if information of the receiving end-user device is found.

In accordance with another aspect, a send message to a receiving driver of a receiving vehicle is generated from a sending end-user device in response to a user event from a sending driver. The send message may be generated to include a voice message created by the sending driver. The send message may be sent to a server using the sending end-user device for processing to identify a receiving end-user device in the receiving vehicle and to send the send message to the receiving end-user device.

In accordance with yet another aspect, a vehicle-to-vehicle communication system is described. The vehicle-to-vehicle communication system may include a frontend subsystem and a backend subsystem. The frontend subsystem may be employed on a sending end-user device for generating a send message with a voice component to a receiving vehicle. The backend subsystem may process the send message to send to the receiving vehicle. In one implementation, the backend subsystem may include a server with a voice recognition module that processes the voice component of the send message from the frontend subsystem to recognize a vehicle registration number, a database module containing vehicle registration numbers, vehicle contact information, and saved send messages, an identification module for searching the database module for the vehicle registration number and vehicle contact information in the voice component, and a communication module for pushing the send message to a receiving end-user device associated with the receiving vehicle.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

FIGS. 3a-e depict various scenarios of an implementation of the V2V App.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

Figure 1:
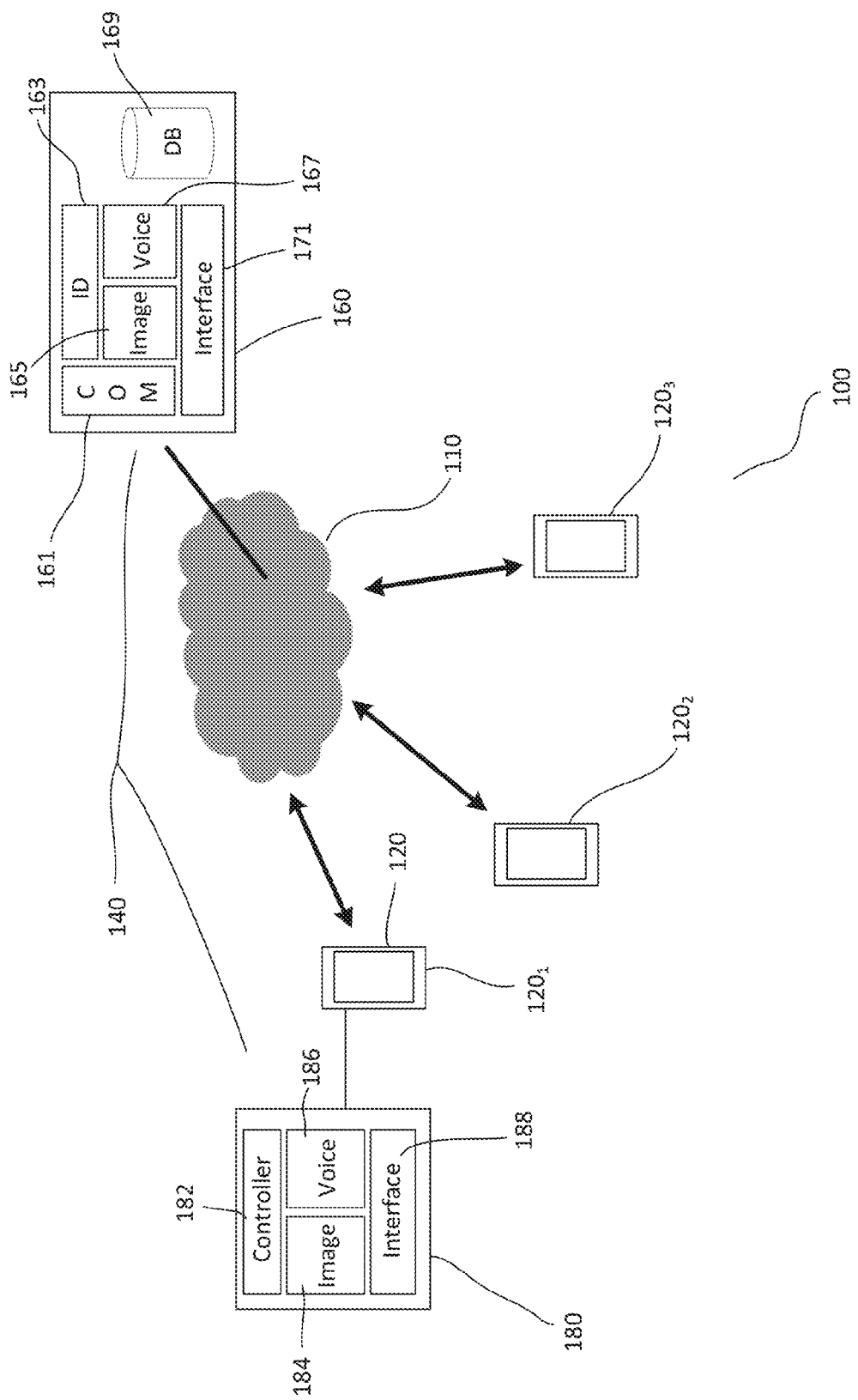
FIG. 1 shows an exemplary implementation of an environment.

FIG. 1 shows a simplified diagram of an exemplary environment or architecture 100. Environment 100 may have a distributed architecture. In one implementation, the environment is a cloud computing environment which includes a cloud 110. The cloud, for example, is a server. The server may include one or more computers. A computer includes a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component.

In the case of a plurality of computers, they are collectively considered as the cloud or cloud server. The computers of the server are connected through a communication network. The communication network may be an internet, an intranet, a local area network (LAN), a wide area network (WAN) or a combination thereof.

The cloud is configured to host and process applications, including storing data associated with the environment. Such hosting and processing may be considered as cloud services provided by the cloud. Various types of cloud services may be provided. The cloud services may be provided in a public, private or hybrid network. The cloud services may be provided by a cloud service provider. For example, the cloud services may be provided by SAP AG. Other types of clouds and cloud providers may also be useful.

End-users may connect to the cloud using end-user devices. An end-user device may be a local computing device with, for example, a local memory and a processor. The memory may be volatile or non-volatile types of non-transitory computer-readable media, such as magnetic media, optical media, random access memory (RAM), read-only memory (ROM), removable media, or any other suitable local or remote memory component. Various types of processing devices may serve as an end-user device. For example, the end-user device may be a PC, a tablet PC, a workstation, a network computer, a kiosk or a mobile computing device, such as a laptop, a tab or a smart phone. Other types of processing devices may also be used. End-user and end-user device may be used interchangeably. For example, when referring to an end-user, it is understood that the end-user connects to the cloud using an end-user device.

Connection to the cloud may be through the internet. The connection may be facilitated using a mobile telecommunication network, such as a 4G network. Other types of connections to the cloud may also be useful. An end-user may access the cloud by having a cloud account. For example, an end-user may access cloud services by logging onto a user account.

In one implementation, the environment 100 includes a vehicle-to-vehicle communication application system 140. The system, in one implementation, is a software tool for facilitating vehicle-to-vehicle communication. Vehicles may be any type of vehicles, such as automobiles, trucks, vans, motorcycles as well as other types of vehicles. For example, any type of vehicles that may have a registration number, such as a plate number may be applicable.

The system 140 includes a backend subsystem 160 and a frontend subsystem 180. The backend subsystem runs on the cloud server while the frontend subsystem runs on an end-user device 120. It is understood that, although only three end-user devices $120_{1-3}$ are shown, the environment may include many more.

In one implementation, a message to a driver in another vehicle (receiving vehicle) is generated by a driver in a vehicle (sending vehicle) using the end-user device with the frontend subsystem. The message is sent to the backend subsystem in the cloud server for processing to identify the receiving vehicle. Once identified, the backend system sends the message to the end-user device in the receiving vehicle. In the event the receiving driver cannot be identified, the message can be stored in the backend subsystem for subsequent access. Messages which are sent may also be stored in the backend subsystem for subsequent access.

An end-user device, in one implementation, is a mobile device. The mobile device may include a processor, a memory, a mobile network communication, a display, a user interface, a camera, a speaker and a microphone. Providing other components for the mobile device may also be useful. The various components of the mobile device may be integrated into a single mobile device, such as smart phones or tablet computer. In some implementations, one or more of the various components of the mobile device may be separate components which are connected to communicate as a unit. For example, some components or all components may be integrated into a vehicle. Other configurations of end-user devices may also be useful.

The frontend subsystem may be downloaded to the end-user device. For example, an end-user may download the frontend subsystem as an App from an App store and install it on the end-user device. The App may be a vehicle-to-vehicle (V2V) communication App. In one implementation, the end-user device may be mounted in a vehicle. In the case of a smart phone, it may be temporarily mounted on the windshield of a vehicle. The camera feature should face outwards while the display faces inwards to be visible to the driver of the vehicle. The display may be mounted horizontally or vertically, depending on the desired width angle. For example, horizontally mounted display (e.g., width larger than height) provides a wider angle than a vertically mounted display (width smaller than height). In other cases, the end-user device may be a permanent fixture of the vehicle.

Communication between the end-user device and the cloud, in one implementation, is by a mobile telecommunication network, such as a 4G network. Other types of communication links between end-user devices and the cloud may also be useful.

In one implementation, the frontend subsystem 180 includes a control (or controller) module 182, an image module 184, a voice module 186 and an App interface module 188. As for the backend subsystem 160, it includes a communication module 161, a vehicle identification module 163, an image processing module 165, a voice recognition module 167, a database module 169 and a message interface module 171.

Regarding the frontend subsystem, when it is running on the end-user device, the control module 182 controls the various other modules of the frontend subsystem, including resources of the mobile device, such as the camera, microphone and speaker. Other modules, for example, may include network and data services. In one implementation, a driver may activate the App or frontend subsystem to run when he or she is in the vehicle.

The App interface 188, in one implementation, is a voice-based interface. For example, the App interface displays information on the screen or display of the mobile device and interacts with the driver using voice. The App interface may also include command or select buttons which the driver may select.

When the App is running, in one implementation, the control module 182 may be configured to cause the camera to operate, picking up image frames of the road. The camera, for example, takes a digital image of what is in front of the vehicle, including right and left sides of the front of the vehicle. In one implementation, the camera continuously takes images of the road in front of the vehicle. The sampling rate, for example, may be about 1 per second. Other sampling rates may also be useful. The sampling rate may be limited by the capabilities of the mobile device. In one implementation, as new images are captured, old images may be discarded. For example, the last x pictures may be saved while others are discarded. For example, the last 5 pictures may be saved. Saving other number of images, including 1, may also be useful. Automatic image capturing, sampling rate and number of saved images may be configured by the user as desired in a settings menu. Default values may be provided which can be overridden by the user.

The image module 184, in one implementation, processes a digital image from the camera. In one implementation, the image module 184 includes image detection. For example, the image module includes a routine for recognizing or detecting the location of a license plate on vehicles in the digital image. For example, the module 184 detects the location of numbers, which indicates the location of the license plate. Once the location of a license plate is detected, that portion of the image is cropped or extracted. The cropped portion, for example, may include the vehicle. In other cases, the cropped portion includes just the license plate. The size of the cropping, for example, may be configured by the user as desired in a settings menu. Default cropping size may be provided which can be overridden by the user. Cropping the image reduces the size of the captured image.

In some cases, an image may include multiple vehicles. For such cases, multiple cropping is performed to produce multiple cropped images, each for respective vehicles. The multiple cropped images are derived from a single captured image. The multiple cropped images, for example, may be sent to the backend subsystem. In one implementation, the multiple cropped images may be processed at the backend server to determine the image for a vehicle which is associated with the message to the receiving driver. In one implementation, cropped images are saved, while original images are discarded. For example, once an original image has been processed, it may be discarded. In one implementation, cropped images from the last x captured images may be saved. The number of cropped images saved, for example, may be configured by the user as desired in a settings menu. Default number of saved cropped images may be provided which can be overridden by the user.

The cropped image or images from the last captured message may be displayed. For example, the cropped image or images may be provided in the mobile device's display by the App interface.

The voice module 186, in one implementation, includes voice recognition. For example, the voice module recognizes voice, such as word, words or phrases, received from a microphone of the mobile device. In one implementation, the voice module recognizes a command to initiate sending a message to another vehicle (e.g., from sending vehicle or driver to receiving vehicle or driver). The command, for example, may be a word or a phrase, such as begin message. Other words or phrases may also be useful to initiate sending a message to another vehicle. Additional commands may also be included for recognition by the voice module. Such additional commands may be related to preparing and sending a message to another vehicle. For example, finish and send commands may be recognized to complete and to send the message. The commands may be configured by the user as desired in a settings menu. For example, the words for each type of command may be configured by the user as desired. Default words for commands may be provided which can be overridden by the user.

When an initiate voice command is detected, for example, the control module of the mobile device of the sending driver causes a message to be prepared for sending to another vehicle, such as to the end-user device of the receiving driver in the receiving vehicle. In one implementation, the message includes two components, an image component and a non-image information component. The image component is an image of the vehicle to which the message is to be sent. For example, the image component includes the cropped image, which may be the license plate or a portion of the vehicle with the license plate. The control module causes the image module to save the most recent cropped images before receiving the initiate send command.

Providing a message with only a non-image information component or other components may also be useful. For example, a user may configure the App to send a message without an image component.

As for the non-image component, it contains information related to and for the receiving driver of the receiving vehicle. In one implementation, the non-image component is a voice component. For example, the control module causes the voice module to record a voice message, forming the voice component. The sending driver may speak, causing the microphone in the mobile device to capture the voice message which is recorded by, for example, the voice module.

The voice message, in one implementation, contains a vehicle ID, message body and driver rating. Providing other elements in the voice message may also be useful. The vehicle ID may be the license plate or vehicle registration number. The message body may include the message to the receiving driver. The message may relate to how the receiving driver is driving. For example, the message may be a message indicating that the receiving driver cut off the sending driver. The driver rating may be, for example, like or dislike of the way the receiving driver was driving. Providing other types of rating system may also be useful. For example, the rating system may include, very bad, bad, good, very good.

The App interface 188 may facilitate in creating the voice message. The interface may include a voice, instructing or requesting the desired information from the driver. For example, the voice interface may verbally request the vehicle ID. After the vehicle ID is recorded, the interface may verbally request the message body. After the message body is recorded, the interface may request the driver rating. In some implementations, the voice interface may just request the driver to input the voice message. Alternatively, the interface may display the requested information on the device display. Other techniques for creating the voice message may also be useful.

The message may include additional information. In one implementation, the message includes time and location information of the message. For example, when the initiate message command is detected, current location of the sending driver and current time are captured by the mobile device. Location information may be derived from, for example, GPS function of the mobile device.

The completed voice message and image are sent to the backend subsystem on the cloud. For example, the message sent may include the voice component, image component, location information and time stamp. The interface may request confirmation from the driver before sending the message. Alternatively, the App automatically sends the message once it is completed. A user may configure the App to either automatically send or wait for confirmation before sending the message. The message interface of the backend subsystem receives the message.

In some implementations, the App is configured to be in non-continuous image capturing mode. In the non-continuous image capturing mode, the camera takes an image when an initiate voice command is detected. For example, the camera and image processing module remains idle until an initiate send message command is detected. Such a configuration reduces consumption of power. For example, power consumption may be an issue when the mobile device is not connected to a power source. The App may be provided with a setting to configure it in continuous image capturing mode or non-continuous image capturing mode.

In other implementations, the App may be configured to process a saved image of the captured image only after an initiate send message command is detected. For example, the App operates in continuous image capturing mode, but non-continuous image processing mode. In non-continuous image processing mode, a saved image is only processed to extract an image of the registration number after the initiate send message command is detected. In one implementation, the App may be configured to send a voice message without an image component. For example, the App may be configured to operate in non-image mode. The App may be configured to send a saved image without cropping as part of the message. For example, the App may be configured to operate in full-image mode. The various modes may be configured in a settings menu of the App. The App may include default modes which can be altered by a user.

In some cases, the App may only contain certain modes. For example, the App may include full-image mode or operate in non-image mode only. In such cases, the App may not need an image module for processing images.

The image processing and voice recognition modules, 165 and 167 process the image and voice components of the messages, respectively. In one implementation, the image component is processed by the image processing module 165 to identify the license plate of the receiving driver. For example, image recognition scans the image to identify the license plate of the vehicle in the image. In one implementation, optical character recognition (OCR) may be employed to translate the image of the license plate to text. Other techniques for translating image to text may also be useful. In one implementation, the voice component is processed by the voice recognition module 167 to identify the license plate of the receiving driver. For example, voice or speech recognition identifies the license plate of the vehicle from the voice message of the sending driver.

The database module 169 may be any type of database. For example, the database module may be an in-memory database. The in-memory database may be a HANA database from SAP AG. Other types of databases may also be useful. The database module is configured to store vehicle id information. In one implementation, the database module includes vehicle id and contact information of the driver of a vehicle as well as the associated device id of the driver's mobile device. Contact information, for example, may include phone number. Other types of contact information, including email address and home address, may also be useful. The vehicle id and contact information may be obtained by, for example, a registration process when the V2V App is downloaded by an end-user. For example, as a user downloads the V2V app and provides his or her vehicle id and contact information, such information and device id of the end-user device used to download the V2V app may be automatically registered to the database module 160 of the backend subsystem. The vehicle id may be automatically associated to the end-user device id as it registered into the database module 160. Other techniques or approaches for obtaining vehicle, driver information and the associated end-user device id may also be useful.

The database module, in one implementation, is configured to store messages generated by sending drivers and driver ratings. A stored message may include receiving driver information, such as license plate and contact information, image, voice and driver rating. Additionally, the message may include location information and time stamp. Other information, such as sending driver information, such as license plate and contact information, may also be included. In some cases, sending driver information may be included in the stored message. Providing the message with other information may also be useful.

The vehicle identification module 163 searches the database module to determine if the vehicle ID of the receiving vehicle exists or is contained in the database. For example, the vehicle ID from the image processing and voice recognition module may be used to query the database module. If the receiving vehicle's contact information is contained in the database, the message from the sending driver is sent to the receiving driver by the communication module 161. The communication module may push the message to the receiving driver's mobile device with the App installed. The message, for example, may include voice, image, driver rating, receiving driver information, location information and time stamp. The sending driver information may also be included in the message. Providing the message with other information may also be useful.

After sending the message to the receiving driver, the message is stored in the database module. If, on the other hand, the receiving vehicle's id or contact information is not contained in the database, the message from the sending driver is stored in the database module.

As discussed, the App may only contain certain modes. For example, the App may operate in full image mode or in non-image mode only. In the case of full image mode, the image module may also perform cropping to extract a portion of the image from the full image for sending to the receiving driver. In the case of non-image mode, no image module is necessary.

Figure 2:
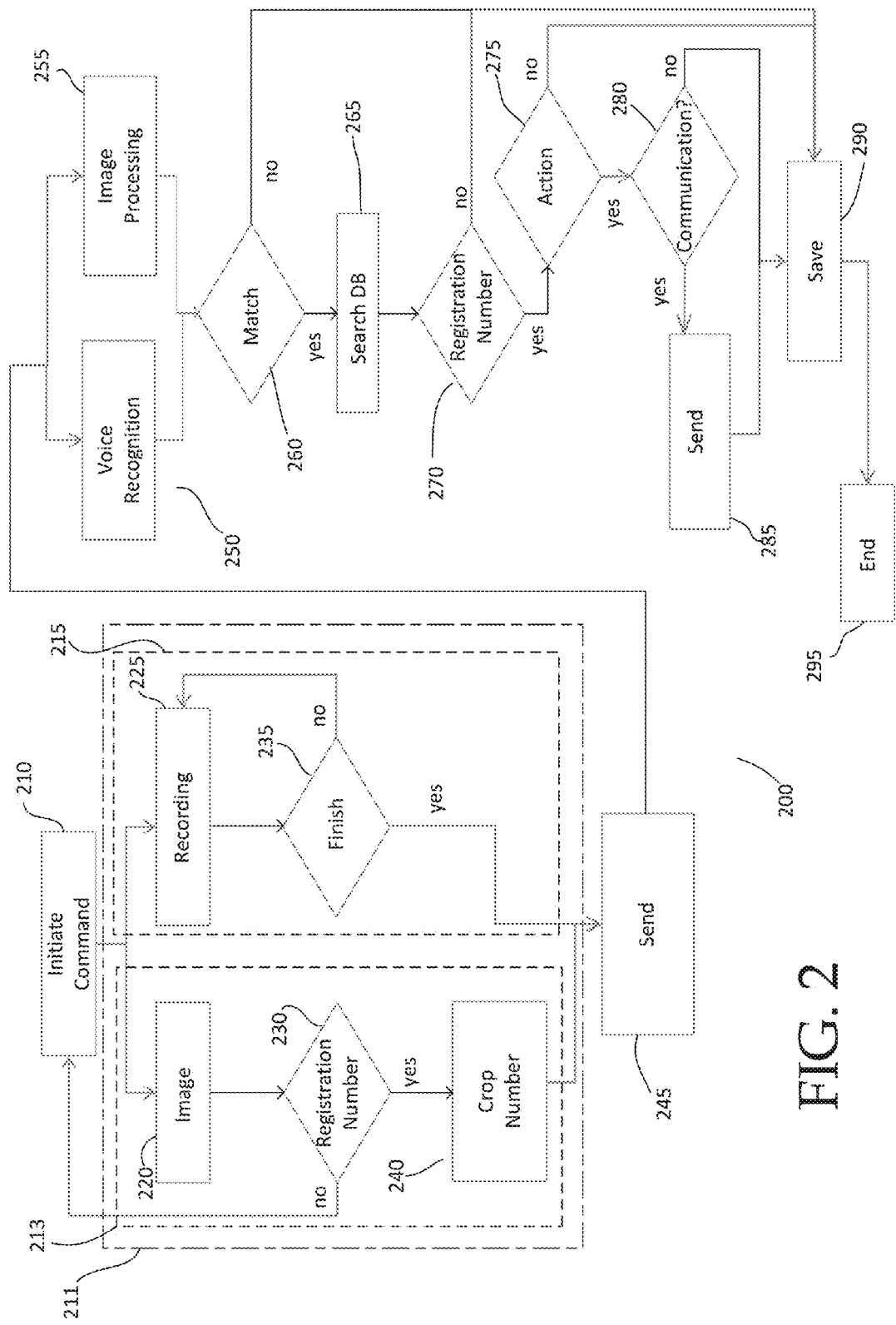
FIG. 2 shows an exemplary implementation of a process of a V2V App.

FIG. 2 illustrates an implementation of a process 200 for generating and sending a message using the V2V App. As discussed, in one implementation, when the App is running, the camera is continuously operating to pick up image frames of the road. The image frames are analyzed to detect vehicle registration or plate numbers of vehicles in the images. For example, the image module 184 of the mobile device analyzes the image to detect the vehicle registration number of vehicles in the image. The registration number is cropped from the image. For example, a portion of the vehicle and its registration number may be cropped from the image.

At step 210, a sending driver initiates sending a send message to a receiving driver. The sending driver, for example, speaks an initiate send message command, causing the mobile device to commence the process of creating a send message 211 for sending to a receiving driver. In one implementation, time stamp and location information of the sending driver is captured or saved.

In one implementation, the process of creating a send message includes creating an image message or component 213 and a voice message or component 215 of the send message. The process of creating the image component and the voice component may be performed in parallel by the image module and voice module of the mobile device. Creating the image and voice components in series may also be useful. For example, the image component may be created followed by the voice component.

To create the image component, a saved image is provided at step 220. The saved image is the image captured just before the initiate send message command is given by the sending driver. Alternatively, the App causes an image to be captured and saved after detecting the initiate send message command. For example, in such case, the camera remains inactive until the initiate send message command is detected.

At step 230, the saved image is processed. In one implementation, the image is processed to determine the location of the vehicle registration number in the image. For example, text detection technique may be employed to determine the location of the vehicle registration number in the image. Once the vehicle registration number is identified in the image, it is extracted from the image at step 240. For example, the vehicle registration number is cropped from the image. In the case that the camera is running in the background, the image module 184 may process the image as it is captured. In other cases, the image module 184 may process the image only after the initiate send message command is received.

The process proceeds to step 245. If the registration number can't be identified in the image, the process returns to step 210. In such case, the driver may receive a feedback and may be prompted to initiate another send message command to save another image.

To create the voice component of the send message, the mobile device commences recording a voice message provided by the sending driver at step 225. The request, for example, may be a voice request using the mobile device's voice interface. The voice message, in one implementation, contains a vehicle ID, message body and driver rating. Providing other elements in the voice message may also be useful. The vehicle ID may be the license plate or vehicle registration number. The message body may include the message to the receiving driver. The message may relate to how the receiving driver is driving. The driver rating may be, for example, like or dislike the way the receiving driver was driving. Providing other types of rating system may also be useful. For example, the rating system may include, very bad, bad, good, very good.

The App interface may facilitate in creating the voice message. The interface may include a voice interface, instructing or requesting the desired information from the driver. For example, the voice interface may verbally request the vehicle ID. After the vehicle ID is recorded, the interface may verbally request the message body. After the message body is recorded, the interface may request the driver rating. In some implementations, the voice interface may just request the driver to input the voice message. Alternatively, the interface may display the requested information on the device display. Other techniques for creating the voice message may also be useful.

The voice module, at step 235, determines if the voice message from the sending driver is finished or not. For example, the voice module may detect a finished command from the sending driver. Other techniques for determining if the message is finished may also be useful. For example, silence of more than a prescribed period of time may indicate that the voice message is finished. The voice module continues to record the voice message until it is finished. Once the voice message is finished, the process continues to step 245.

At step 245, the send message, which includes the voice and image components is sent to the backend subsystem on the server. For example, the send message is sent to the cloud for processing. In one implementation the send message also includes location and time information related to the send message.

As described, the image and voice components are processed in parallel. For example, when an initiate send message command is detected, the App creates the image and voice components in parallel. Processing the components serially may also be useful.

The backend subsystem processes the voice and image components to determine the vehicle ID or registration number of the receiving vehicle. In one implementation, the voice recognition module processes the voice component at step 250 and the image processing module processes the image component at step 255. The voice and image components may be processed in parallel. Alternatively, the voice and image components may be processed serially. The image processing module, for example, employs text recognition techniques, such as OCR to convert the image of the registration number to text while the voice recognition module employs voice recognition on the voice message to identify and convert the spoken registration number to text. Other techniques for converting the registration number to text from the image and voice components may also be useful.

At step 260, the vehicle registration number from the voice and image components are compared. For example, the vehicle identification module 163 compares the vehicle registration number identified by the voice and image modules. If the vehicle ID or registration number from the voice and image components match, the process continues to step 265. In the case that there is no match, the message is saved at step 290 and the sending driver is informed that the message is unable to send due to non-matching registration numbers between the voice and image components. At step 265, the database is searched to see if it contains the vehicle ID and associated driver information. For example, the database module is queried, searching for the registration number identified by the voice and image components.

If the database does not contain information related to the registration number, it proceeds to step 290. If the database contains information related to the registration number, the process proceeds to step 275. At step 275, the process determines if there are actions by the App to perform. For example, if no actions exist, the process proceeds to step 290. If an action exist, the process continues to step 280 to determine if the action is to send the message or not. If the action is to send the message to the receiving driver, the process proceeds to step 285. If not, the process proceeds to step 290.

At step 285, the send message is sent to the receiving driver, based on the contact information for the registration number in the database. For example, the communication module 161 in the backend subsystem sends the send message to the receiving driver. In one implementation, the send message includes the voice and image components. Additionally, the time and location information is included with the send message. At step 290, the send message is saved in the database and the process terminates at step 295.

Figure 3B:
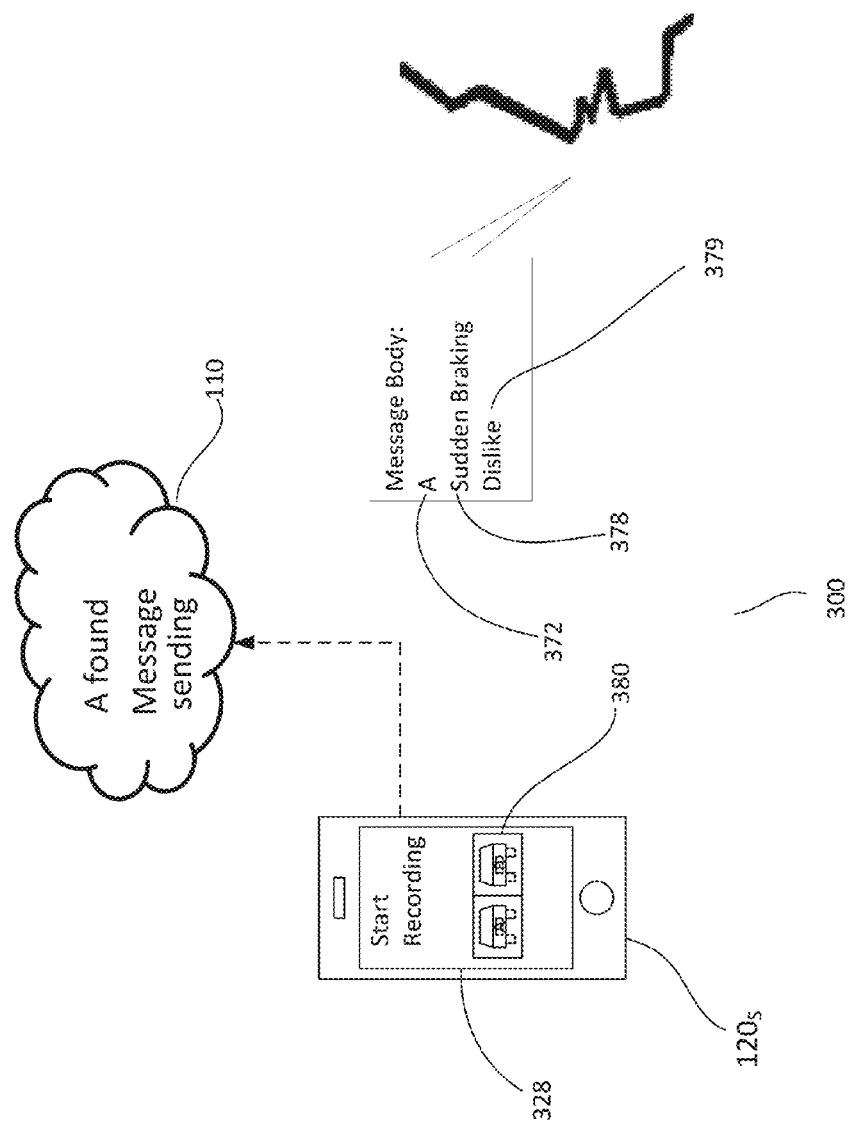

FIGS. 3*a-e* depict various scenarios 300 of an implementation of the V2V App. Referring to FIG. 3*a*, an end-user device 120$_S$, such as a mobile phone, is shown. The end-user device is installed with a V2V App. The end-user device, for example, is a device of a sending user. The device is mounted onto a vehicle. The App may be configured to operate in continuous image capturing and continuous image processing modes. For example, the App causes the device to capture and process images as they are taken. As illustrated, an image 360 of the road is captured and saved. The saved image shows first and second vehicles 372 and 374. The saved image is processed to crop the first and second registration numbers 382 and 384 of the first and second vehicles. The cropped registration numbers 380 are displayed in the device display 328.

In alternative implementations, the App may be configured to operate in non-continuous image processing mode. In such case, the saved image is not processed to crop and display the registration numbers of vehicles in the image. The App may also be configured to operate in non-continuous image capturing mode. In such cases, images are not captured and saved until an initiate send message command is detected.

FIG. 3b depicts the scenario where an end-user device $120_S$ installed with a V2V App detects an initiate send message command from the driver. The App prepares to send a send message to a receiving driver. In the continuous image capturing and image processing modes, the App takes the last cropped image as the image component of the send message. In the non-continuous image capturing mode, the App captures an image and processes it. The App interface, for example, displays the cropped image on the display 328. In some cases, depending on the number of registration numbers detected in the image and cropped, the displayed image may include multiple cropped image portions. As shown, each cropped image portion includes registration number and the vehicle. Providing a cropped image which shows only the registration number may also be useful. Other configurations of cropped images may also be useful. The App interface may request the driver to generate a voice component of the send message. The driver speaks, generating the voice component. For example, the voice component includes the registration number of the receiving driver 372, message 378 and rating 379.

The send message is sent to the backend subsystem. For example, the backend subsystem is located on a cloud server 110. The backend subsystem processes the send message. If the receiving driver is identified, the send message is sent to the receiving driver. The send message, for example, may be sent via a push notification service to the receiving driver's mobile device as his or her vehicle id and associated mobile device id is identified. On the other hand, if the receiving driver cannot be identified, the send message is saved in the backend subsystem. A message may be sent to the sending driver to indicate the action taken. For example, the sending driver is informed that the message is sent or not sent to the receiving driver.

FIG. 3c depicts the scenario where the backend subsystem processes the send message. The send message is sent to the mobile device $120_R$ of the receiving driver. The send message, for example, is verbally played on the mobile device of the receiving driver. As shown, the voice message includes the message from the sending driver as well as time frame which the send message was generated. The image component may be displayed on the display of the device of the receiving driver. Other configurations of the send message to the receiving driver may also be useful.

Figure 3D:
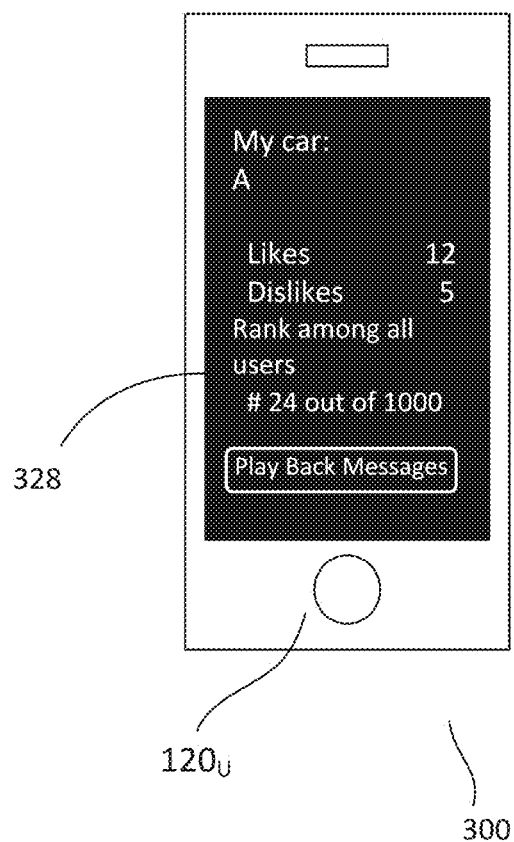

FIG. 3d depicts a scenario 300 of a user with the App. As shown, a user may access the database module to access driving ratings through device $120_U$ installed with the App. For example, as shown, the driver may access ratings related to his vehicle, such as vehicle A. The interface displays the number of categories of ratings. As shown, the rating categories include likes and dislikes and ranking among ranked drivers. A command button may be provided to enable the user to replay the messages from sending drivers.

Figure 3E:
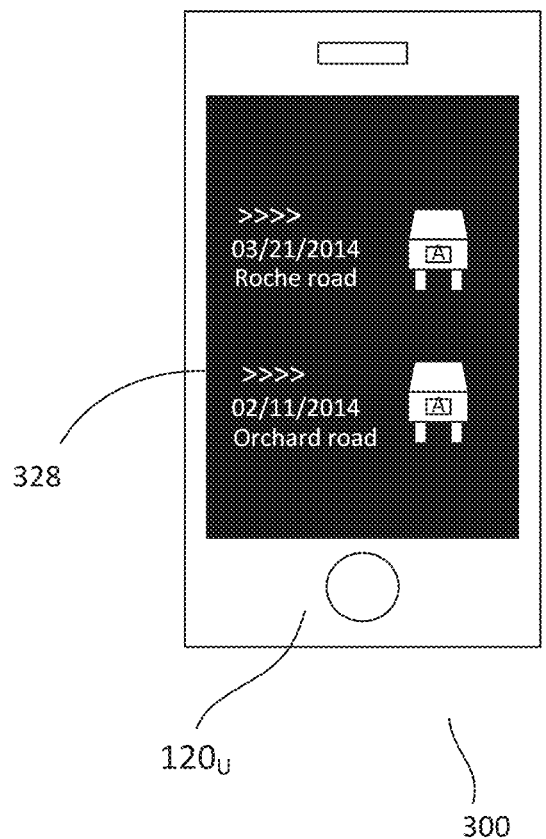

FIG. 3e depicts another scenario 300 of a user with the App. The user may access the database module to access driver ratings using mobile device $120_U$ installed with the App. As shown, the interface displays the list of sending drivers' send messages for the user (receiving driver). For example, the list includes details, such as location and date of the send message from sending drivers. The user may select message to play by, for example, clicking on it.

As described, the vehicle-to-vehicle communication system may be embodied as an application. For example, the system may be embodied as a software application. The different components of the system may be separate software applications configured to operate or interact with each other, whether on the cloud or on the end-user devices. The source code of the applications may be compiled to create an executable code. The codes, for example, may be stored in a storage medium, such as one or more storage disks or in memory of a server and/or end-user devices. Other types of storage media may also be useful.

As discussed, the App includes frontend and backend subsystems. The backend subsystem resides in a server, such as a cloud server. As for the frontend subsystem, a user may download and install it in an end-user device. For example, a user may go to an App store and download the App and install it in the end-user device, such as a mobile phone. The App may be configured to operate in various modes. For example, the App may be configured to operate in continuous image capturing mode, continuous image processing mode, non-continuous image processing mode, non-continuous image capturing mode, as well as full or non-full image modes. In some cases, the App may be configured to operate in non-image mode. For example, the send message may include a voice component without an image component. The various modes may be selected by a user, for example, using the App's settings menu.

The App enables vehicle-to-vehicle communication, without drivers knowing each other. The App may be employed to provide real-time feedback of another driver's actions on the road. This may improve driving conditions on the road. Furthermore, the App may provide access to drivers to view their past driving behavior. For example, the send messages including driver rating are saved. Drivers may be ranked based on their ratings. Such ratings and rankings may be useful, for example, for insurance companies to assess driver risk and associated premiums. Other applications may also be useful for the App.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for vehicle-to-vehicle communication comprising:
in response to a user event from a sending driver, initiating a voice command by the sending driver for generating a send message to a receiving driver of a receiving vehicle from a sending end-user device, wherein generating the send message comprises providing an image of the receiving vehicle of the receiving driver, creating a voice message by the sending driver, and determining geographical identification derived from a global positioning system of the sending end-user device and including a time stamp, wherein the image is created immediately preceding or succeeding the initiation of the generation of the send message;
sending the send message encapsulating the image, the voice message, and the geographical identification to a server using the sending end-user device; and
processing the send message by the server, wherein processing comprises identifying the receiving vehicle based on the encapsulated image and the geographical identification, searching to find information of a receiving end-user device, and sending the send message to the receiving end-user device if information of the receiving end-user device is found.

2. The computer-implemented method of claim 1 comprising:
saving the send message in the server after sending to the receiving end-user device; and
saving the send message in the server if the receiving end-user information is not found.

3. The computer-implemented method of claim 1 wherein providing the image comprises:
capturing the image with the receiving vehicle; and
processing the image to extract an image portion of the registration number of the receiving vehicle.

4. The computer-implemented method of claim 1 wherein providing the image comprises:
continuously capturing images of a road in front of the sending driver;
providing the image with the receiving vehicle which is captured just before the user event.

5. The computer-implemented method of claim 1 wherein providing the image comprises:
continuously processing an image as it is captured to extract at least an image portion of the registration number of the receiving vehicle; and
providing the processed image.

6. The computer-implemented method of claim 1 further comprising processing the image to extract at least an image portion of the registration number of the receiving vehicle.

7. The computer-implemented method of claim 1 wherein creating the voice message comprises the sending driver speaking the vehicle registration number of the receiving vehicle, a voice message to the receiving driver and a driver rating of the receiving driver.

8. The computer-implemented method of claim 7 wherein processing the send message by the server comprises:
processing the voice message using voice recognition to determine the vehicle registration number of the receiving driver from the voice message;
processing the image using image recognition to determine the vehicle registration number of the receiving driver from the image;
determining if the vehicle registration number of the receiving driver from the image matches that from the voice message; and
searching to find information of the receiving end-user device if the vehicle registration number from the image matches that from the voice message.

9. The computer-implemented method of claim 8 comprises:
saving the send message in the server after sending to the receiving end-user device;
saving the send message in the server if the receiving end-user information is not found.

10. A vehicle-to-vehicle communication system comprising:
a frontend subsystem on a sending end-user device for receiving an initiate send message voice command to generate a send message, wherein the send message comprises and encapsulates a voice component to a receiving vehicle, an image of the receiving vehicle, and geographical identification derived from a global positioning system of the sending end-user device and including a time stamp, wherein the image is created immediately preceding or succeeding the initiation of the generation of the send message; and
a backend subsystem for processing the send message to send to the receiving vehicle, the backend subsystem comprises a server with a voice recognition module, the voice recognition module processes the voice component of the received send message from the frontend subsystem to recognize a vehicle registration number,
a database module containing vehicle registration numbers, vehicle contact information, and saved send messages,
an identification module for searching the database module for the vehicle registration number and vehicle contact information in the voice component, and
a communication module for pushing the send message to a receiving end-user device associated with the receiving vehicle.

11. The system of claim 10 wherein:
the send message comprises an image component, the image component includes the vehicle registration number of the receiving vehicle; and
the backend subsystem further comprises an image processing module, the image processing module processes an image of the send message to recognize a registration number of a vehicle in the image.

12. The system of claim 11 wherein the identification module searches the database module if the vehicle registration number in the image and voice components match.

13. The system of claim 10 wherein the backend subsystem further comprises a message interface module for receiving and sending send messages.

14. The system of claim 10 wherein the receiving end-user device comprises the frontend subsystem.

15. The system of claim 10 wherein the database module comprises an in-memory database module.

16. The system of claim 10 wherein the frontend subsystem comprises:
a controller module for detecting the initiate send message voice command;
a voice module for generating the voice component of the send message in response to the initiate send message voice command; and
an interface module for sending and receiving send messages.

17. The system of claim 16 wherein the frontend subsystem comprises an image module for generating an image component of the send message.

18. A computer-implemented method for vehicle-to-vehicle communication comprising:
continuously capturing images of a road in front of a sending driver:
in response to a user event from the sending driver, initiating a voice command by the sending driver for generating a send message to a receiving driver of a receiving vehicle from a sending end-user device, wherein generating the send message comprises creating a voice message by the sending driver, providing an image of the receiving vehicle which is captured just before the user event, and determining geographical identification derived from a global positioning system of the sending end-user device and including a time stamp, wherein the image is created immediately preceding or succeeding the initiation of the generation of the send message; and
sending the send message encapsulating the image, the voice message, and the geographical identification to a server using the sending end-user device for processing to identify, using the image and the geographical identification, a receiving end-user device in the receiving vehicle and to send the send message to the receiving end-user device.

19. The computer-implemented method of claim 18 wherein generating the send message further comprises processing the image of the receiving vehicle to extract an image portion of the registration number of the receiving vehicle.

20. The computer-implemented method of claim 18 wherein creating the voice message comprises the sending driver speaking the vehicle registration number of the receiving vehicle, a voice message to the receiving driver and a driver rating of the receiving driver.

* * * * *